INVENTOR
HARVEY R. CHAPLIN, JR.

BY *H. L. Gordon*

AGENT.

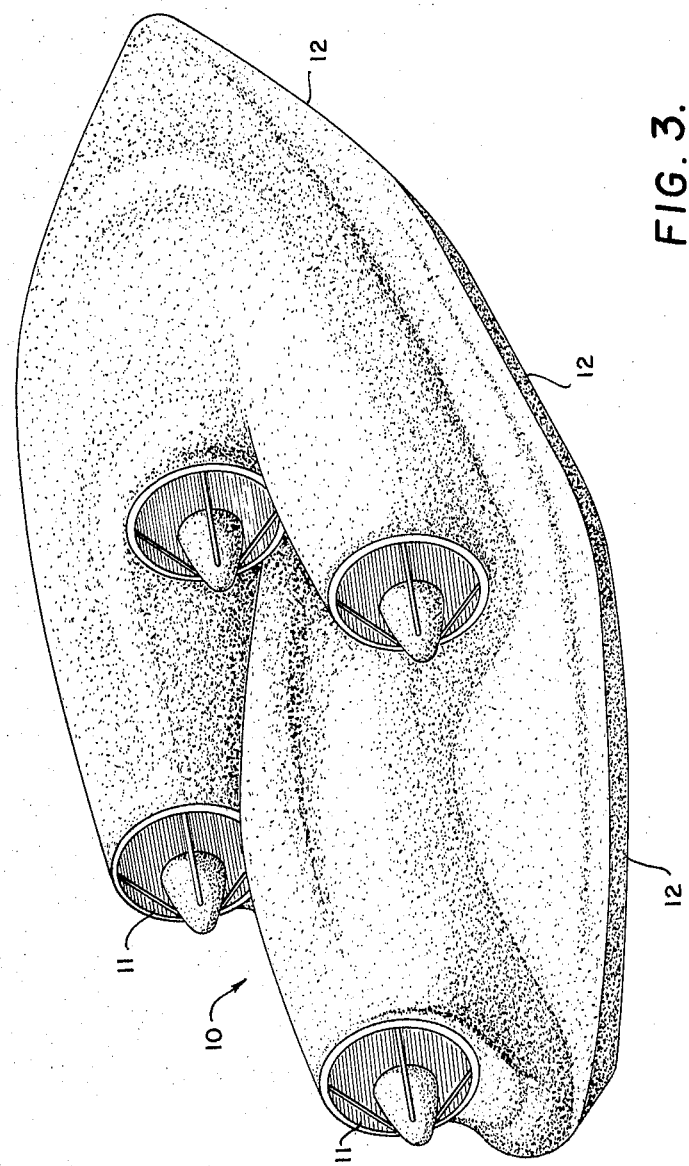

INVENTOR
HARVEY R. CHAPLIN, JR.
BY
AGENT.

United States Patent Office 3,249,165
Patented May 3, 1966

3,249,165
SIMPLIFIED NOZZLE CONTROL FOR GROUND EFFECT MACHINES
Harvey R. Chaplin, Jr., 3507 Ottowa St., Arlington, Va.
Filed Sept. 6, 1961, Ser. No. 136,375
2 Claims. (Cl. 180—7)

The invention described herein may be manufactured and used by or for the Government of the United States of America for governmental purposes without the payment of any royalties thereon or therefor.

This invention relates to a simplified nozzle control for ground effect machines and more particularly to a system for controlling the direction of jet efflux from a nozzle so as to control the propulsive force of a ground effect machine with an integrated propulsion system.

While almost any ground effect machine will lift vertically from a surface, most ground effect machines will not provide sufficient horizontal thrust for fast travel without accessory blowers, propellers, or complicated movable vanes. These machines are therefor unnecessarily complicated and expensive or are subject to damage.

While the variation of the jet efflux from a separate, horizontally oriented nozzle of a ground effect machine might seem to be a simple method of achieving horizontal thrust, the jet efflux variation usually causes a serious loss in the high pressure air under the ground effect machine which results in a loss of lift and a great loss in stability of the machine.

An object of this invention, therefore, is to vary the horizontal thrust of a ground effect machine by varying the direction of jet efflux from the nozzle to propel a ground effect machine without accessory propulsion units, or to assist in propelling a ground effect machine with accessory propulsion units.

The nozzle of a ground effect machine will normally operate at a few inches to a few feet above an uneven surface such as ground or water and at horizontal speeds of hundreds of knots. The failure of the machine to lift over bumps at this speed will subject the nozzle to severe impact loads, and, if the nozzle sustains injury, it may release the air cushion and cause the machine to crash.

Therefore, another object of the invention is to provide a strong, light nozzle which is not readily damaged and which will not lose the air cushion under the ground effect machine.

Another object of this invention is to vary the horizontal thrust of a ground effect machine with an integrated propulsion system without loss of stability or lift.

Other objects and many of the attendant advantages of this invention will be readily appreciated as the same becomes better understood by reference to the following detailed description when considered in connection with the accompanying drawings wherein:

FIG. 3 is a perspective view of a hexagonal shaped ground effect machine.

FIGS. 4a, 4b, 4c, 5a, 5b and 5c respectively are illustrative views in cross section of arrangements of nozzle control means according to the present invention.

Figure 1:
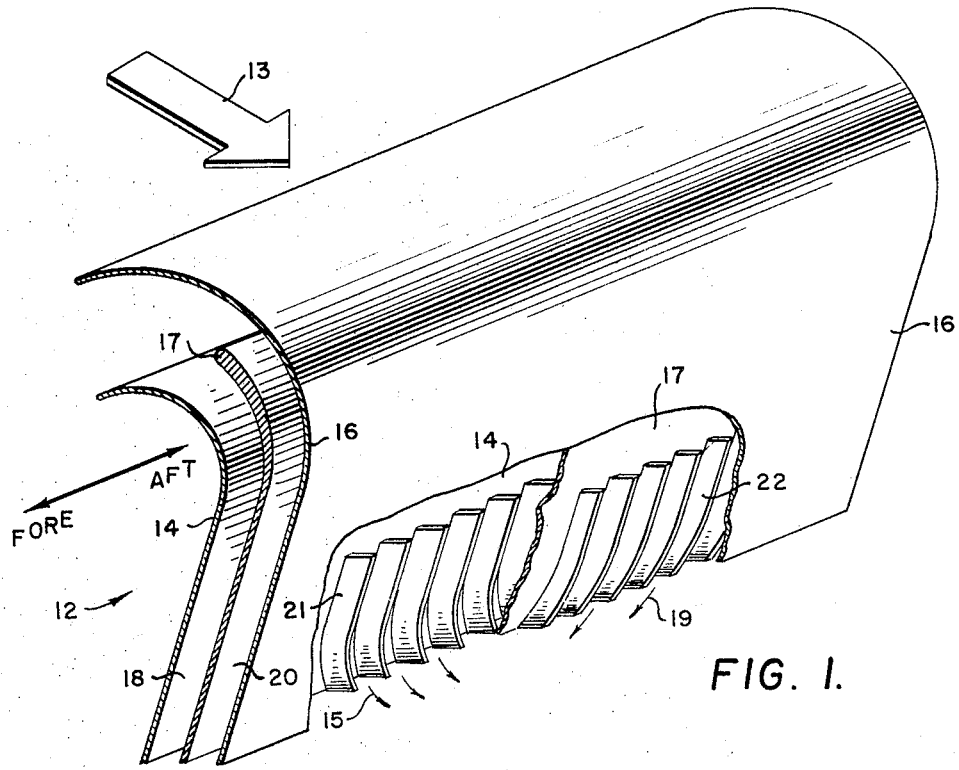
FIG. 1 is a perspective view of the simplified nozzle control showing the nozzle, splitter plate, and fixed vanes.

Referring now to the drawings, FIG. 1 is a perspective view of part of one section of a nozzle for a ground effect machine such as shown in FIG. 3. In FIG. 3 the ground effect machine 10 has one or more air compressors 11 which supply air to six nozzles 12 arranged around the periphery of machine 10 in a roughly hexagonal pattern.

The nozzles 12, although indicated as single units, are connected together to form a circumferential or peripheral nozzle completely around the ground effect machine to contain the high pressure air cushion.

Referring again to FIG. 1, the fluid flow 13 from a compressor 11 is shown entering the nozzle 12 which has an inner wall 14, an outer wall 16, and a dividing means in the form of a streamlined splitter plate 17. An inner passage 18 and an outer passage 20 are thus formed for the fluid flow 13. A series of streamlined fixed vanes 21 are integrally formed in passage 18 between inner wall 14 and splitter plate 17 for directing the jet efflux 15 in passage 18 in one direction (aftward). A second set of streamlined fixed vanes 22 formed between splitter plate 17 and outer wall 16 direct the jet efflux 19 from outer passage 20 in the other direction (forward) to achieve a jet reaction on the nozzle 12 in the aft direction.

The jet reaction from the two pasages 18 and 20 thus produces forward and aft thrust which results in approximately zero horizontal thrust for the whole nozzle 12.

Figure 2:
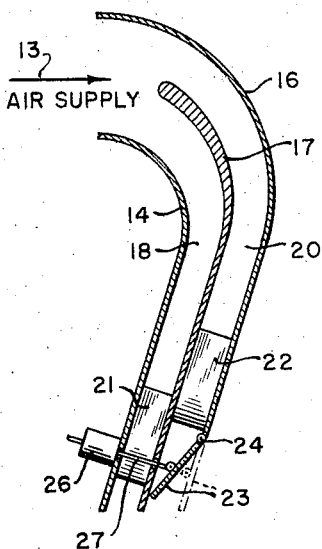
FIG. 2 is a cross-section view of the nozzle control with the addition of the control flap and hydraulic actuator.

Referring also to FIG. 2, which is a cross-section view of FIG. 1, a flap 23 is attached to outer wall 16 by hinge 24 and is operated by hydraulic actuator 26 mounted on inner wall 14 and link 27.

Flap 23, which is shown in a partially closed position, restricts the fluid flow through outer passage 20 so that a higher percentage of the fluid flow passes through inner passage 18 than outer passage 20 which results in a net forward thrust of the nozzle 12.

The net propulsive thrust to the ground effect machine will be the vector sum of the thrust of the nozzles 12 arranged around the periphery of the machine so that the machine will have thrust in the forward, side, or rotational directions.

A major advantage of this type of construction is the strength, light weight, and impact resistance of the peripheral area of the ground effect machine. Thus, the fixed vanes can be made very light and thin to provide a minimum of flow resistance to the fluid flow and can be made integral with or welded to the walls.

With flap 23 fully open, with equal areas of passages 18 and 20, and with equal angles of vanes 21 and 22, the net thrust is in the aft direction since the jet efflux from inner passage 18 is influenced by the air cushion under the machine to provide some braking action or for backing. The net horizontal thrust is then brought to zero by adjustment of flap 23 for hovering.

The ratio of forward to aft horizontal thrust is determined by the ratio of the areas of passages 18 and 20, the angles of the fixed vanes 21 and 22 with respect to each other, and the position of flap 23.

As flap 23 is closed to produce a net forward horizontal thrust by reducing the fluid flow through outer passage 20, the compressor 11 pressure will rise due to the increased resistance of the nozzle 12 which will increase the flow through inner passage 18. This increased flow through inner passage 18 will tend to vary the high pressure cushion under the machine since there will be a variation in the flap position of all the nozzles around the periphery of the machine in order to achieve a net forward thrust.

In order to stabilize the ground effect machine under these conditions, the air pressure is increased as the flaps are closed to maintain a relatively uniform jet momentum from nozzle 12 so as to maintain a uniform air cushion under the machine. This stable air cushion will reduce pitch and roll of the machine during travel even though the air pressure and quantity output of the compressor varies considerably.

While one nozzle control is shown in FIG. 1, FIGS. 4a, 4b and 4c and 5a, 5b and 5c are different embodiments for various applications. Both FIGS. 4 and 5 show nozzles of the same basic type as FIG. 1 with inner wall 14, outer wall 16, splitter plate 17, and integral fixed vanes 21 and 22 which direct the jet efflux in different directions for horizontal thrust variations.

Figure 4A:
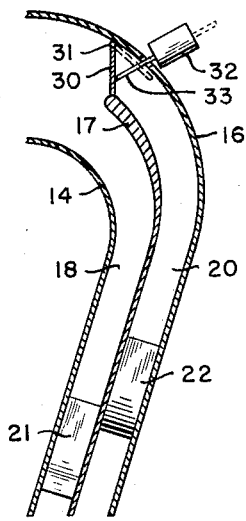

FIG. 4a shows a nozzle control where the control flap 30 is inside the nozzle and attached by hinge 31 to outer wall 16. Actuator 32 on outer wall 16 moves flap 30 by arm 33 from wall 16 to splitter plate 17 to close outer passage 20 for forward thrust. In FIG. 4a, the flap 30 is completely removed from the periphery of the ground effect machine so that any impact of the nozzle with the ground or water will be absorbed by the integral walls, splitter plate, and vanes where the nozzle has its greatest strength.

Figure 4C:
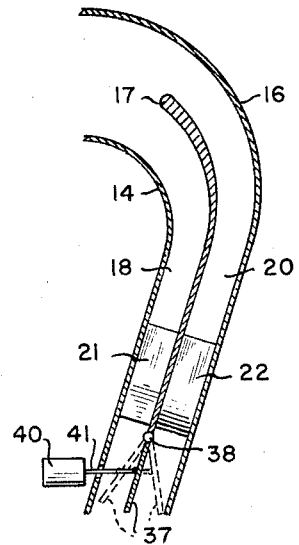
Figure 4B:
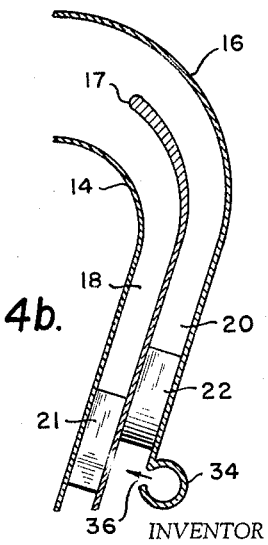

FIG. 4b shows a nozzle control where the flap is replaced by a jet spoiler which is a tube 34 attached to outer wall 16 and having an opening 36 for directing a high speed jet of air across outer passage 20 to restrict the flow through outer passage 20. Tube 34 may be supplied by a line from the compressors 11 or by a separate pump (not shown). The jet spoiler 36 is strong and light and not as subject to damage as flap 23 in FIG. 2.

The FIG. 4c nozzle control is a movable flap 37 which is attached by hinge 38 to splitter plate 17 and forms a part of the splitter plate. Actuator 40 by link 41 moves flap 37 between the dotted positions shown to vary the flow between inner passage 18 and outer passage 20 to achieve a resultant thrust. Flap 37 is shielded by outer wall 16 and is less subject to physical damage than flap 23 in FIG. 1.

All of the above nozzle controls vary the effective nozzle area and therefore vary the nozzle resistance which requires matching of the compressor pressure and r.p.m. to achieve optimum performance.

Figure 5A:
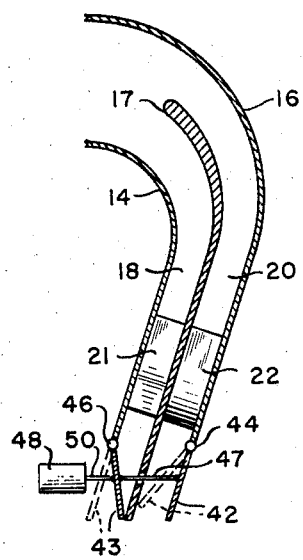
Figure 5B:
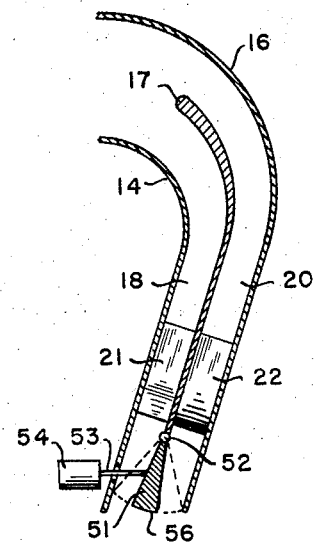
Figure 5C:
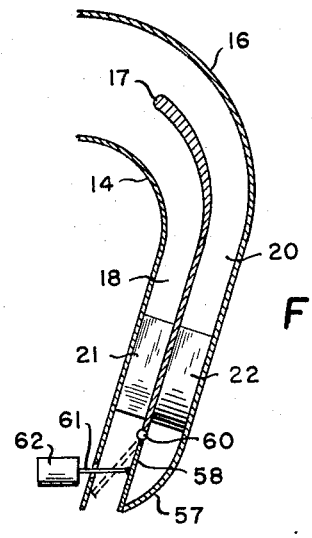

In FIGS. 5a, 5b and 5c are shown three embodiments which have constant nozzle resistance despite flap variations and horizontal thrust variations.

FIG. 5a has two flaps 42 and 43 which are attached by hinges 44 and 46 to inner and outer walls 14 and 16 respectively. Link 47 spaces flaps 42 and 43 so that the exhaust area between the flaps is approximately equal to the exhaust area of one passage 18 or 20. Actuator 48 moves both flaps with arm 50 and link 47 so that the inner and outer passages are opened and closed simultaneously. Therefore, the jet efflux can be varied between the passages to provide full forward or full aft thrust with practically no variation in the nozzle resistance or necessary compressor matching.

FIG. 5b shows a nozzle with a wedge-shaped central flap 51 attached by hinge 52 to splitter plate 17 and operated by arm 53 from actuator 54. The trailing edge 56 of flap 51 is approximately equal to the area of one passage so that, as the actuator moves the flap back and forth across the nozzle, passages 18 and 20 are alternately opened and closed to provide full forward or aft thrust with little variation in nozzle resistance.

FIG. 5c shows a nozzle where outer wall 16 is curved over toward splitter plate 17 as indicated at 57. Splitter plate 17 has a flap 58 with hinge 60 and operating arm 61 driven by actuator 62.

Actuator 62 varies flap 58 from the position shown where outer passage 20 is fully closed and inner passage 18 fully open to the dotted position where outer passage 20 is fully open and inner passage 18 fully closed for forward and aft thrust. The integrated nozzle, splitter plate, and vanes provide a strong unitary structure with impact protection of flap 58 by the curved section 57.

Obviously many modifications and variations of the present invention are possible in the light of the above teachings. It is therefore to be understood that within the scope of the appended claims the invention may be practiced otherwise than as specifically described.

What is claimed is:

1. An air cushion providing nozzle for use in ground effect machines, said nozzle comprising:
   first and second spaced wall means;
   a third wall means disposed between said first and second wall means and dividing the space therebetween into first and second flow passages of substantially equal size, said third wall means terminating short of the terminations of said first and second wall means;
   said first and second wall means having edge portions defining therebetween a nozzle opening of substantially the same size as one of said flow passages, the edge portion of one of said first and second wall means converging toward the edge portion of the other of said first and second wall means to define said nozzle opening;
   first fixed vane means disposed in said first flow passage for directing fluid flow therein to provide a component of horizontal thrust in a first direction;
   second fixed vane means disposed in said second flow passage for directing fluid flow therein to provide a component of horizontal thrust in a direction opposite to said first direction; and
   flap means mounted on said third wall means between said edge portions of said first and second wall means and movable between a first position for obturating said first flow passage and a second position for obturating said second flow passage, said flap means being movable between said first and second positions for varying the relative flows in said passages without substantially changing the size of said nozzle opening, whereby the resultant horizontal thrust may be varied from a maximum in said first direction through a zero condition to a maximum in the opposite direction without substantially affecting the total flow of air through said nozzle.

2. An air cushion providing nozzle as defined in claim 1, for use at the periphery of ground effect machines, and wherein:
   said first and second wall means are inner and outer wall means, respectively;
   the edge portion of said inner wall means being substantially straight; and
   the edge portion of said outer wall means curving downwardly and inwardly toward the edge portion of said inner wall means to define said nozzle opening.

References Cited by the Examiner
UNITED STATES PATENTS
3,073,549   1/1963   Griffith _____ 180—7

FOREIGN PATENTS
219,133   11/1958   Australia.
1,240,721   8/1960   France.

OTHER REFERENCES
"Design News," May 23, 1960, pages 6 and 7.
David Taylor Model Basin Report 1463, Aero Report 994, December 1960.

A. HARRY LEVY, *Primary Examiner.*